S. L. WORSLEY.

MACHINES FOR TAPPING SCREW-NUTS.

No. 7,153.

Reissued May 30, 1876.

Witnesses

J. C. B. Woods.

Geo. Tullu

Inventor

Saml. L. Worsley.

THE NORRIS PETERS CO., PHOTO-LITHO., WASHINGTON, D. C.

UNITED STATES PATENT OFFICE.

SAMUEL L. WORSLEY, OF PROVIDENCE, RHODE ISLAND, ASSIGNOR TO AMERICAN SCREW COMPANY.

IMPROVEMENT IN MACHINES FOR TAPPING SCREW-NUTS.

Specification forming part of Letters Patent No. 166,490, dated August 10, 1875; reissue No. 7,153, dated May 30, 1876; application filed March 15, 1876.

*To all whom it may concern:*

Be it known that I, SAMUEL L. WORSLEY, of the city and county of Providence, in the State of Rhode Island, have invented certain new and useful Improvements in Machines for Tapping Nuts; and I do hereby declare that the following specification, taken in connection with the drawings making a part of the same, is a full, clear, and exact description thereof.

Figure 1:
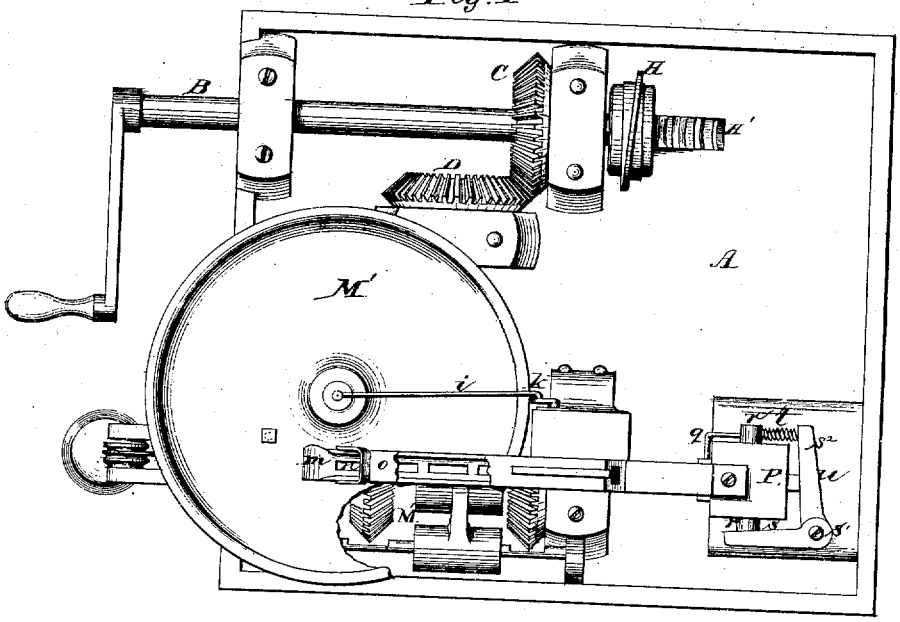
Figure 2:
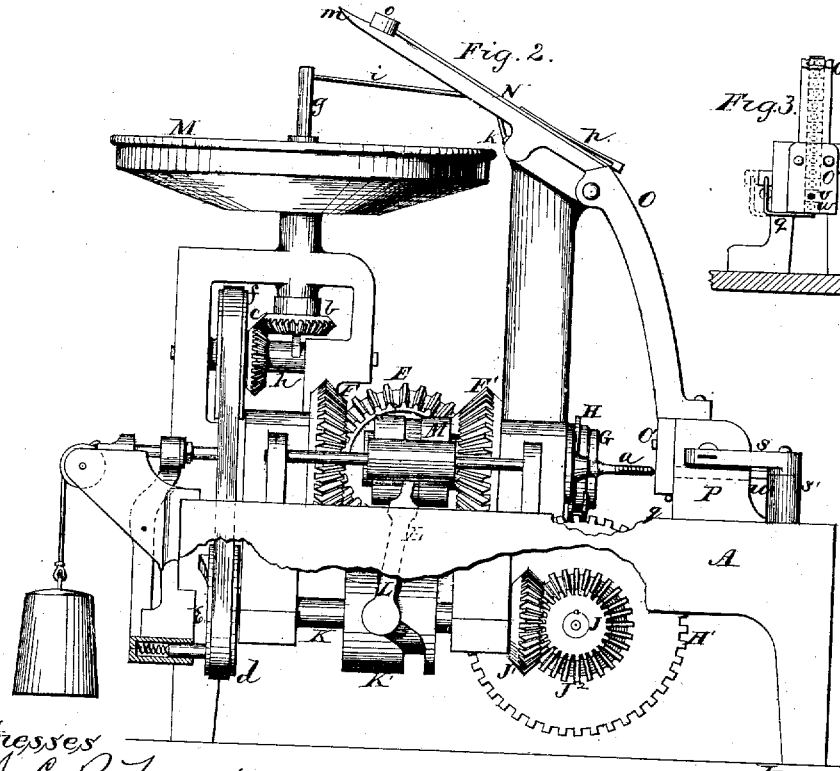
Figure 3:
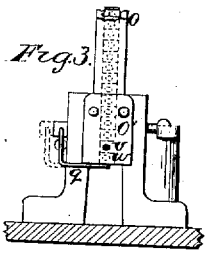

Figure 1 is a top view. Fig. 2 is a side elevation. Fig. 3 is a view in section of a portion of the feeding-stack and the let-off contrivance.

The machine hereinafter described, in some of its features, is similar to other machines used in the manufacture of screws. It is, however, specially contrived for tapping the threads in nuts; and the means by which a continuous supply of blanks is fed one at a time, so as to be threaded by a tap, and discharged from the machine in case they have been threaded, but not otherwise, constitute the subjects to which my improvements relate.

In the drawings, A represents the bed of the machine. B is the driving-shaft, to which the power is applied. The driving-shaft carries a bevel-gear, C, which, engaging with a fellow gear, D, gives motion to a transverse shaft, upon the other end of which is a bevel-gear, E, Fig. 2, which engages with two bevel-pinions, F F′, fitted to constantly revolve in opposite directions around the shaft G. This latter shaft carries the thread-cutting tap *a*, and it is arranged so as to be capable of an endwise movement in its bearings and through the pinions F F′, for the purpose of enabling the tap to be brought up to and pass through the nut-blank to be threaded, and to move back to allow of the presentation of a new blank. The driving-shaft B also carries a worm-wheel, H, Fig. 1, which engages with a worm-gear, H′, and gives motion to a transverse shaft, J, underneath the platform of the bed A, Fig. 2. This shaft, through the bevel-gears $J^1$ $J^2$, Fig. 2, gives motion to the shaft K, and to the cam K′ keyed thereto. The revolving cam K′ gives a vibratory movement to a shipper-bar, L, and this latter, engaging with a sliding clutch, M, attached to the tap-shaft G by means of a spline-connection, causes said clutch to come into engagement alternately with first one and then the other of the oppositely-revolving gears F F′, the faces of the clutch and the inner faces of the gears being furnished with suitable clutch-pins for the purpose. The tap-shaft G will necessarily be revolved in one direction when the clutch M is engaged with the pinion F, and in the opposite direction when it is engaged with the pinion F′.

The feeding device shown in the drawings is that which is familiar to constructers of screw machinery as the "Sloan feed." The means by which this feed is adapted to supply nuts to the machine instead of screw-blanks is one of the features of the present invention.

As in the case when screw-blanks are to be fed, the nut-blanks are placed in a mass in the dish M′, which is made to revolve in a horizontal plane by means of the bevel-gears *b c*, deriving motion from the shaft K, communicated by the belt *d* and pulleys *e f*. The separator N has an alternately upward and downward movement in a vertical plane imparted to it by means of the lifter-rod *g*, operated by a cam-toe on the revolving shaft *h*, and the arm *i*, attached at one end to the lifter-rod, and at the other end to a crank-arm, *k*, on a shaft, to which the separator is keyed in a manner well understood.

In order to adapt the separator for use in selecting nut-blanks instead of screw-blanks from a mass, the end of the separator which is dipped into the mass of blanks in the revolving dish is made shovel-shaped, as seen at *m*, Fig. 1. A mortise, *n*, is also cut through the blade of the shovel, large enough to allow a blank, which is taken up edgewise, to fall through it. In combination also with the end of the separator as thus constructed, is a guard, *o*, having two vertical sides and a back piece, while the bottom of the separator is excavated, so as to make a flaring groove to guide the blanks to the railway-guide in the separator, along which latter it is intended the blanks shall slide when the shovel end of the separator is elevated, and be conducted into the similar coinciding guide in the stationary stack O.

For the purpose of preventing the blanks from shooting out of the open end of the railway-guide in the separator while the rear end of the latter is tipping downward to make connection with the stack, a spring-check, *p*, is combined with the separator, and which is raised to allow the passage of blanks when the two sections of the railway-guide are in alignment, as shown at Fig. 2. The stack O is mounted on the top of a holder, O′, for the nut, while it is being threaded. This holder has an opening through it, communicating with the passage-way through the stack, as seen in section at Fig. 3, and is, in fact, a continuation of the stack, but is constructed of sufficient strength to enable it to resist the twisting strains incident to the working of the tap in cutting the thread in the nuts.

The next feature of my invention consists of the means by which the finished nuts are discharged one by one. The devices to accomplish this are operated by the threading-tap itself, so that it is certain that only blanks which have been entered by the threading-tap will be discharged.

This mode of operation of the machine renders it unnecessary to inspect each nut, as would be required in case the operation of the discharger was not made dependent upon the tap. The whole column of blanks and one finished nut at the bottom of the column are supported, when the tap is not in action, by a check bar or plate, *q*, Fig. 3. This check-bar is attached to one end of a rod, *r*, fitted to slide in a hole through the head-block P, to which the holder O′ is fastened, and in rear of the holder. The other end of the said rod is pivoted to the arm *s* of a bell-crank mounted on a post-standard, $s^1$. The other arm, $s^2$, of the bell-crank is connected, by means of a coiled spring, *t*, with a staple set in the side of the head-block P. To the arm $s^2$ a rod, *u*, is pivoted. This rod enters the head-block P, and extends up to the column of nut-blanks in the holder, Fig. 2, and its axis should be coincident with the axis of the tap. The next blank which is to be threaded, *v*, Fig. 3, rests upon the blank which was last threaded, *w*, and this latter is supported by the check-rod *q*, the distance between the check and the under side of the blank *v* being just equal to the width of a blank.

It is obvious that with this construction of the machine the tap *a*, after it has passed through the hole in the blank *v*, will come into contact with the end of the rod *u*, whereby the bell-crank lever will be operated, and the check-rod *q* be moved away from beneath the previously-threaded blank *w* when this drops from the machine. The column of blanks is, at this time, supported by the nut *v*, through which the tap *a* is inserted. As the tap unscrews itself from the nut *v* the spring *t* acts to restore the check-rod to its former position, and when the tap is clear of the now finished nut the latter falls into the holder a distance equal to its width, and is followed by the column of blanks above it. All the above-described operations are now repeated.

The drawings also show a combination of devices whereby the threading-tap can be brought up to the nut-blank to commence the threading operation under a yielding pressure.

The combination which contains this feature, although of my invention, is not claimed in this patent, but is made the subject of claim in another application for Letters Patent, filed by me September 16, 1875, for improvements in machines for threading screws, for the reason that such invention was made in connection with such last-named machine at an earlier date than the date of the invention described in this patent.

What I claim as my invention in this patent is—

1. The combination of the revolving dish M′, for containing nut-blanks in a mass, and the vibrating separator N, when the latter is constructed with a shovel end, *m*, a mortise, *n*, and guard *o*, substantially as described.

2. The combination of the vibrating mortised separator N with a stationary receiving-stack and a spring-check, substantially as described.

3. The combination of the threading-tap *a* with the devices, substantially as described, for discharging the nuts one by one.

4. The combination and arrangement of the threading-tap *a* with the stack O and holder O′, for the nut-blanks, whereby the said tap, while threading the blank in the column of blanks next above the last-threaded blank, shall support the whole column of blanks above the tap while the underlying nut is being discharged, substantially as specified.

SAML. L. WORSLEY.

Witnesses:
J. C. B. WOODS,
GEORGE FULLER.